(12) United States Patent
Cerniway

(10) Patent No.: US 10,816,370 B2
(45) Date of Patent: Oct. 27, 2020

(54) VIBRATION DAMPING OF AN ANCILLARY DEVICE ATTACHED TO A MARINE STREAMER AND METHOD

(71) Applicant: SERCEL, INC., Houston, TX (US)

(72) Inventor: Matthew Cerniway, Katy, TX (US)

(73) Assignee: SERCEL, INC., Houston, TX (US)

( * ) Notice: Subject to any disclaimer, the term of this patent is extended or adjusted under 35 U.S.C. 154(b) by 232 days.

(21) Appl. No.: 15/921,057

(22) Filed: Mar. 14, 2018

(65) Prior Publication Data
US 2018/0283909 A1    Oct. 4, 2018

Related U.S. Application Data

(60) Provisional application No. 62/479,406, filed on Mar. 31, 2017.

(51) Int. Cl.
| | |
|---|---|
| *G01D 11/10* | (2006.01) |
| *F16F 15/08* | (2006.01) |
| *G01V 1/38* | (2006.01) |
| *F16F 3/087* | (2006.01) |
| *F16F 3/093* | (2006.01) |
| *G01V 1/20* | (2006.01) |

(52) U.S. Cl.
CPC ............ *G01D 11/10* (2013.01); *F16F 3/0876* (2013.01); *F16F 3/093* (2013.01); *F16F 15/08* (2013.01); *G01V 1/201* (2013.01); *G01V 1/3817* (2013.01); *G01V 1/3826* (2013.01); *G01V 1/3843* (2013.01); *F16F 2224/025* (2013.01); *F16F 2226/04* (2013.01)

(58) Field of Classification Search
CPC ...... G01D 11/10; G01V 1/3843; G01V 1/201; G01V 1/3826; G01V 1/3817; F16F 3/0876; F16F 15/08; F16F 3/093; F16F 2224/025; F16F 2226/04; F16F 1/376
USPC .......................................................... 367/20
See application file for complete search history.

(56) References Cited

U.S. PATENT DOCUMENTS

| | | | | |
|---|---|---|---|---|
| 3,606,218 | A * | 9/1971 | Enlund et al. | F16L 3/1091 248/74.2 |
| 4,671,120 | A * | 6/1987 | Fowler | G01C 17/26 33/354 |
| 5,709,497 | A | 1/1998 | Zoch et al. | |
| 6,263,823 | B1 | 7/2001 | Olivier | |
| 8,279,031 | B2 * | 10/2012 | Fullerton | F16F 6/00 267/140.15 |
| 2008/0291778 | A1 * | 11/2008 | Faucheaux, Jr. | G01V 1/201 367/16 |

\* cited by examiner

*Primary Examiner* — Daniel L Murphy
(74) *Attorney, Agent, or Firm* — Patent Portfolio Builders PLLC

(57) ABSTRACT

A low-vibration collar system for vibration mitigation in a device towed in water. The low-vibration collar system includes a clamp attached to a streamer towed underwater by a seismic vessel, the streamer comprising a plurality of sensors to record seismic data; a collar configured to be attached to the clamp; a connecting mechanism located on the collar and configured to attach an ancillary device to the collar; and a vibration mitigation system configured to attenuate an amplitude of a vibration produced by the ancillary device. The vibration interferes with seismic data recorded by seismic sensors located on the streamer.

18 Claims, 12 Drawing Sheets

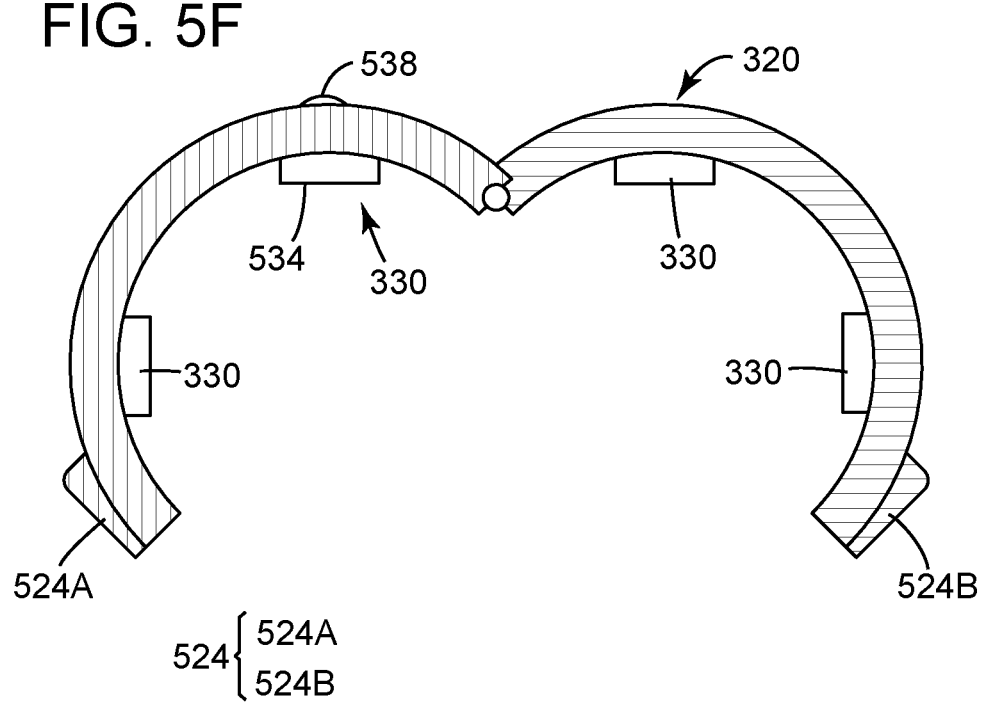

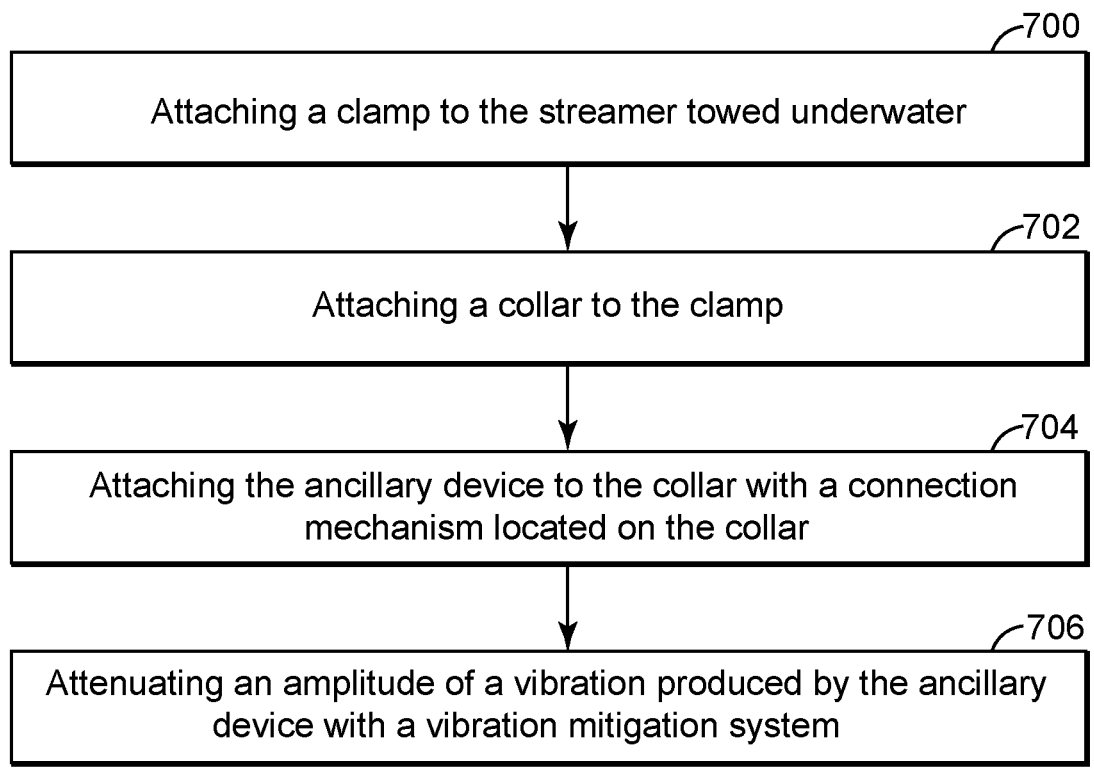

VIBRATION DAMPING OF AN ANCILLARY DEVICE ATTACHED TO A MARINE STREAMER AND METHOD

BACKGROUND

Technical Field

Embodiments of the subject matter disclosed herein generally relate to methods and devices for vibration mitigation, and more specifically, to a collar system that attaches an ancillary device to a marine streamer and reduces noise generated by the ancillary device.

Discussion of the Background

A marine streamer typically includes sensor components, data-transmission cables, power-transmission cables and strength enhancing and buoyancy enhancing components arranged in a single cable. The marine streamer is used for gathering data on the nature and composition of the earth below a body of water using seismic imaging techniques. The marine streamer may be designed to reduce hydrodynamic induced flow noise. For example, the marine seismic cable may be cylindrical.

FIG. 1 depicts a traditional marine seismic data acquisition system. A vessel 101, including a lead-in towing assembly 102, may deploy and tow streamers 103, on or below the surface of the water. The streamers 103 may be of any suitable length, and may be made up of shorter connected sections 106 of electro-mechanical cabling which may also be of any suitable length. For example, a streamer 103 may be kilometers in length, with each section 106 being, for example, 75 meters to 200 meters in length. Sections 106 may be detachable from each other. Seismic data acquisition systems may make use of more than one streamer 103. The streamer 103 may be deployed as a single section 106, a linear series of sections 106, or as a horizontal offset series of sections 106, producing a streamer spread. The streamers may be deployed to be horizontal, slanted, or curved.

Sections 106 of the streamer 103 include seismic sensors 104, typically hydrophones, geophones, accelerometers, electro-magnetic sensors, optical sensors, gravity sensors, or a combination thereof and may be distributed at regular intervals along the streamer 103.

A seismic source 108 may be used to produce a seismic wave, using any suitable manner of generating acoustic energy. The seismic source may include one or more air guns or vibratory elements. When conducting an acoustic survey, the seismic wave may be reflected by the geologic features of the sea floor and picked up by the sensors 104. Vibrations emanating from the head of the streamer spread 110, near the marine vessel 101, may contaminate the seismic signals measured by the sensors 104.

Radial vibration isolation modules 109 may be placed between the towing assembly 102 and the streamers 103, at the head of the streamer spread 110, in order to mitigate the transmission of vibration noise. There are several types of radial vibration isolation modules 109 that may be used in the streamers 103 at the head of the streamer spread 110. Each of the available types of radial vibration isolation modules 109 may include a single stretch section with vibration attenuation that occurs due to a complex spring rate of the radial vibration isolation module 109. Radial vibration isolation modules 109 may be tailored to attenuate vibration over the frequency bandwidth of 2 to 250 Hz, which may be common in seismic acquisition.

The streamers 103 may each include one or more ancillary devices 107, which are externally attached to the streamers. These ancillary devices may be positioning devices, also known as birds or navigation control devices, recovery devices, etc. These ancillary devices are typically clamped to the outsides of the streamers 103.

Because the streamers 103 are deployed in a viscous fluid, for example, water, the streamers 103 are subject to energy sources from both man-made sources, such as energy transmitted through the tow assembly 102, or energy from the propulsion system of the marine vessel 101, or energy from the ancillary devices externally attached to the streamer, and natural sources, such as wave motion and weather. The energy from these sources may diminish the quality of the seismic data recorded by the sensors 104, as they may interfere with the signal from the acoustic energy reflected off the sea floor. Thus, the signal measured by the sensors 104 of a streamer 103 may be divided into two parts, the "signal" pertaining to the geophysical structure of the sea floor, and "noise," which may be picked up from other man-made or natural sources. The signal is desired while the noise contaminates the signal.

Existing noise suppression hardware, such as the radial vibration isolation modules 109, which are concentrated at the head of the streamer spread 110, between the towing assembly 102 and the streamers 103, may not provide a sufficient level of noise abatement for the noise introduced by the movement of the ancillary devices in water.

In addition, for multi-component streamers that include sensors that either directly measure the acceleration and/or are susceptible to motion, the noise introduced by the ancillary devices is more critical. In order to maximize the performance of such streamers, only particle motion resulting from a reflected pressure wave should be seen by the streamers sensors. At-sea testing of the streamers has shown the noise floor of a multi-component streamer to be controlled by vibrations induced by the use (attachment) of ancillary devices. Traditional attachment systems currently on the market (see, for example, U.S. Pat. Nos. 5,709,497 and 6,263,823) were not designed to mitigate vibration from either the collar itself or the ancillary device.

Thus, there is a need for an apparatus and method for vibration mitigation that overcomes the problems mentioned above.

SUMMARY

In various embodiments, an apparatus and method are provided for vibration mitigation through a novel collar system. A novel low-vibration collar system for vibration mitigation includes a clamp attached to a streamer towed underwater by a seismic vessel, the streamer comprising a plurality of sensors to record seismic data; a collar configured to be attached to the clamp; a connecting mechanism located on the collar and configured to attach an ancillary device to the collar; and a vibration mitigation system configured to attenuate an amplitude of a vibration produced by the ancillary device. The vibration interferes with seismic data recorded by seismic sensors located on the streamer.

In another embodiment, there is a low-vibration collar system for vibration mitigation that includes a clamp to be attached to a cable, and a collar located over the clamp and only partially encircling the cable. The collar is configured to receive an ancillary device.

In still another embodiment, there is a method for attaching an ancillary device to a streamer with a low-vibration collar system. The method includes attaching a clamp to the streamer towed underwater; attaching a collar to the clamp; attaching the ancillary device to the collar with a connecting mechanism located on the collar; and attenuating an amplitude of a vibration produced by the ancillary device with a vibration mitigation system, wherein the vibration mitigation system includes plural elastic insulation pads located between the streamer and the clamp and a suspension mechanism located between the clamp and the collar. The vibration interferes with seismic data recorded by seismic sensors located on the streamer.

BRIEF DESCRIPTION OF THE DRAWINGS

The accompanying drawings, which are incorporated in and constitute a part of the specification, illustrate one or more embodiments and, together with the description, explain these embodiments. In the drawings:

FIGS. 5A to 5F illustrate the suspension mechanism of the low-vibration collar system;

FIG. 7 is a flowchart of a method for attaching an ancillary device to a streamer with a low-vibration collar system.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. In various embodiments as illustrated in the figures, a low-vibration collar system is discussed.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, a low-vibration collar (LVC) system for attaching an ancillary device to a cable (e.g., streamer), includes a vibration mitigation system that has at least one of four different vibration mitigation mechanisms. The four vibration mitigation mechanisms include: (1) elastic isolation pads, (2) pre-loaded assembly, (3) a suspension system and (4) a spatial filter of rotational motion. These vibration mitigation mechanisms are now discussed in detail.

Figure 1:
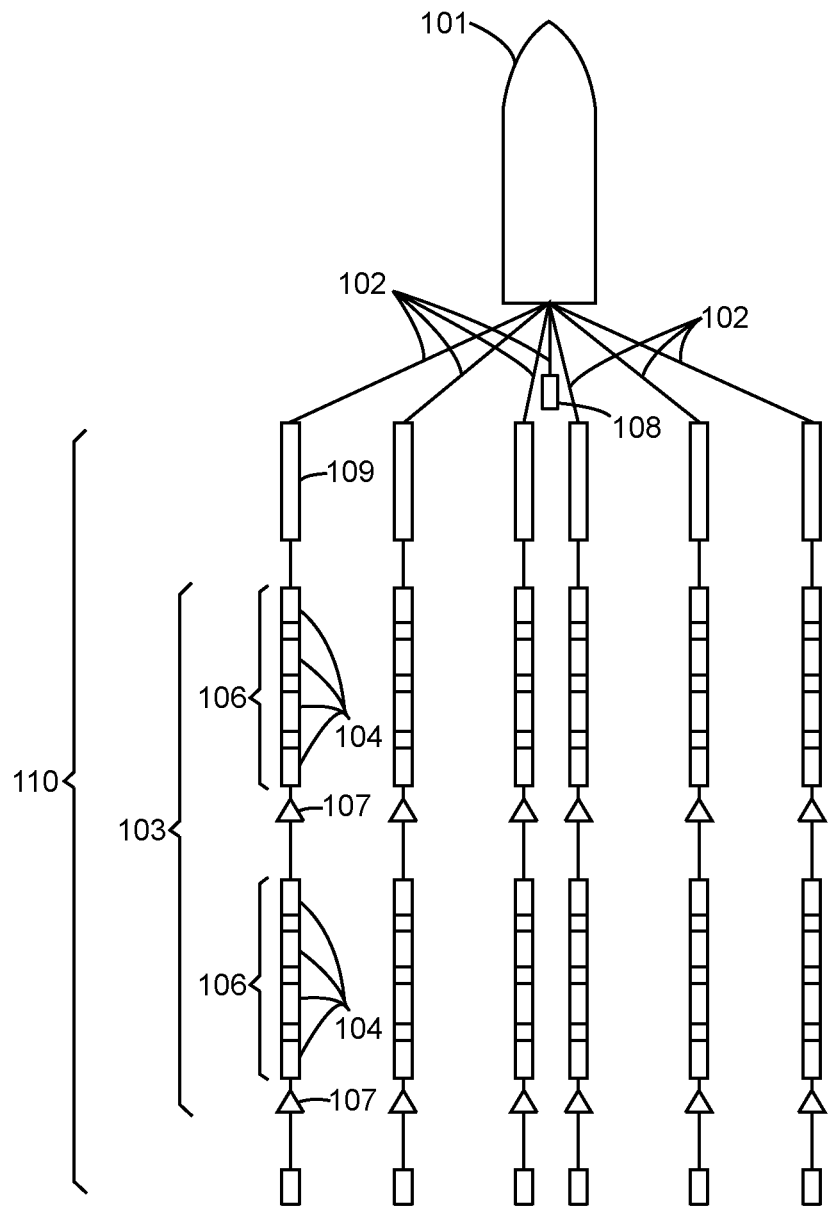
FIG. 1 illustrates a marine seismic data acquisition system.
Figure 2A:
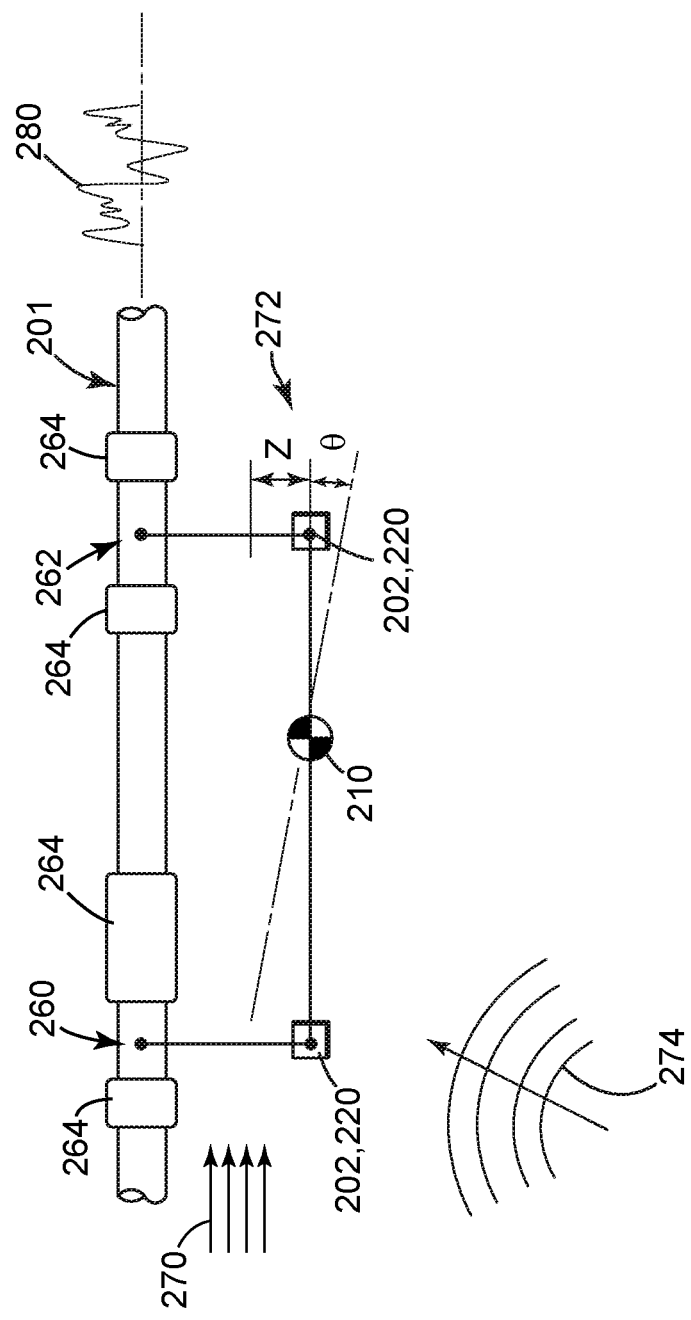
FIG. 2A illustrates the vibration noise introduced by a conventional collar system and FIG. 2B illustrates a reduced vibration noise introduced by a low-vibration collar system according to an embodiment of the present invention.

One of the problems facing the traditional collar systems is discussed with regard to FIG. 2A and an advantage of the novel LVC system noted above is illustrated in FIG. 2B. More specifically, FIG. 2A shows a streamer 201 to which an ancillary device 210 is attached with a traditional clamp and collar system (202 and 220), at a head-end interface 260 and a tail-end interface 262. Note that plural overmolds 264 are formed at these interfaces to hold the clamp and collar system 202 and 220 in place. The overmolds may be formed directly on the streamer. The overmold may include one or more of power transmitting devices and communication devices for exchanging power and/or data with the attached ancillary device. However, one skilled in the art would understand that an overmold is not necessary for attaching the ancillary devices to the streamer.

The water velocity 270 generates various forces on the ancillary device 210, which cause the device to move relative to the streamer (the ancillary device rattles relative to the streamer, which is recorded as noise by the accelerometer sensors). The two degrees of freedom (vertical motion and rotation or rocking) of the ancillary device relative to the streamer are illustrated by reference number 272. A pressure field (waves) 274 resulting from direct and/or reflected seismic waves is also shown. All these factors generate a time series of vibrations 280 that are transmitted to the streamer from the ancillary device via the traditional clamp and collar system. All these vibrations negatively impact the quality of the recorded seismic data.

Figure 2B:
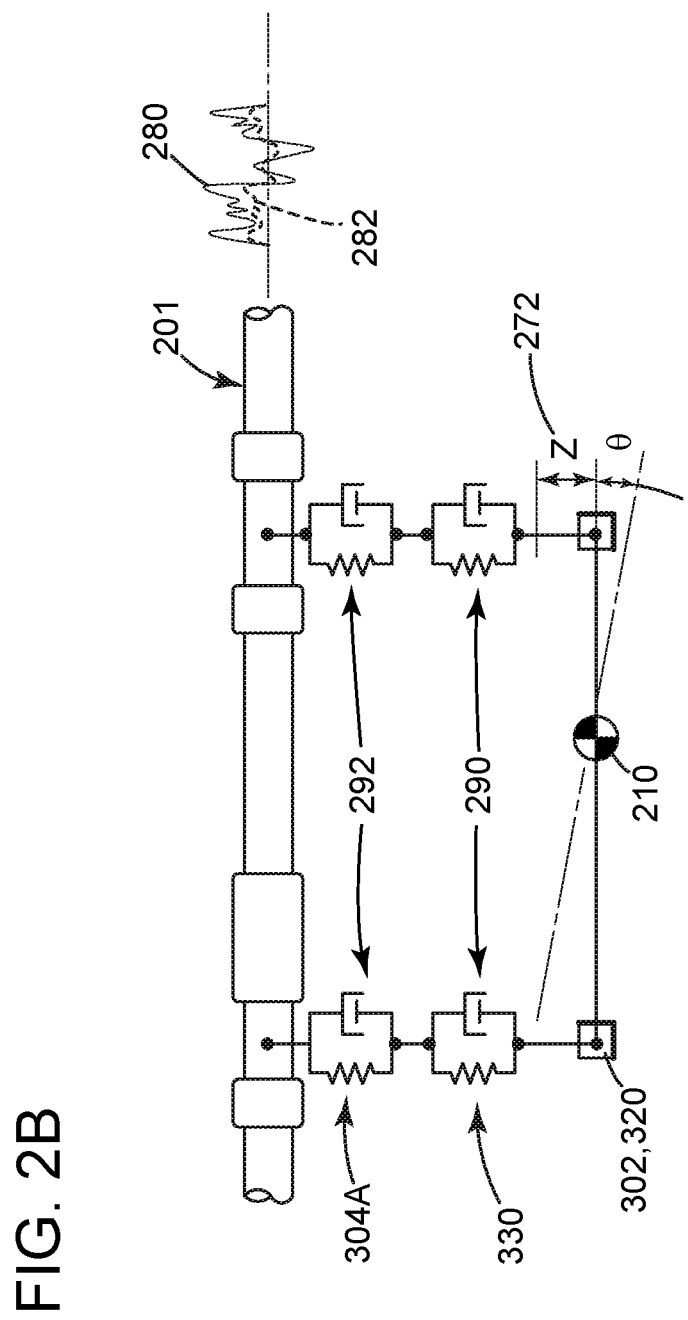

The amplitude of these vibrations is significantly reduced when a novel clamp and collar system 302, 320 (to be discussed with regard to FIGS. 3A to 3C) is used, as shown in FIG. 2B. FIG. 2B simultaneously shows the time series of vibrations 280 of the traditional system and the transmitted vibrations 282 for the novel system 302, 320. FIG. 2B also shows the spring and damper representation 290 of a suspension system 330 and the spring and damper representation 292 of elastic isolation pads 304A-D (herein referred to as pads 304).

Figure 3A:
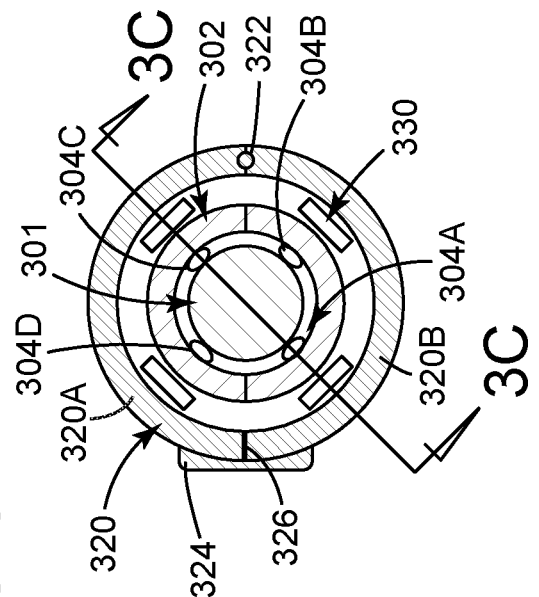
FIGS. 3A to 3C illustrate the low-vibration collar system.
Figure 3B:
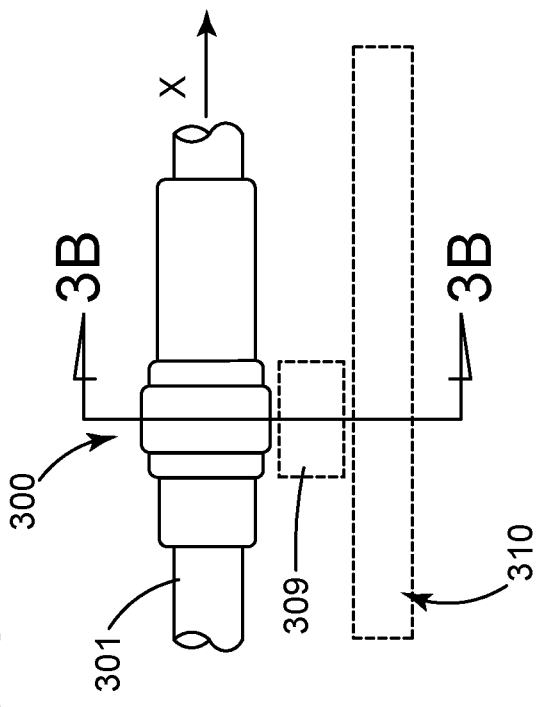
Figure 3C:
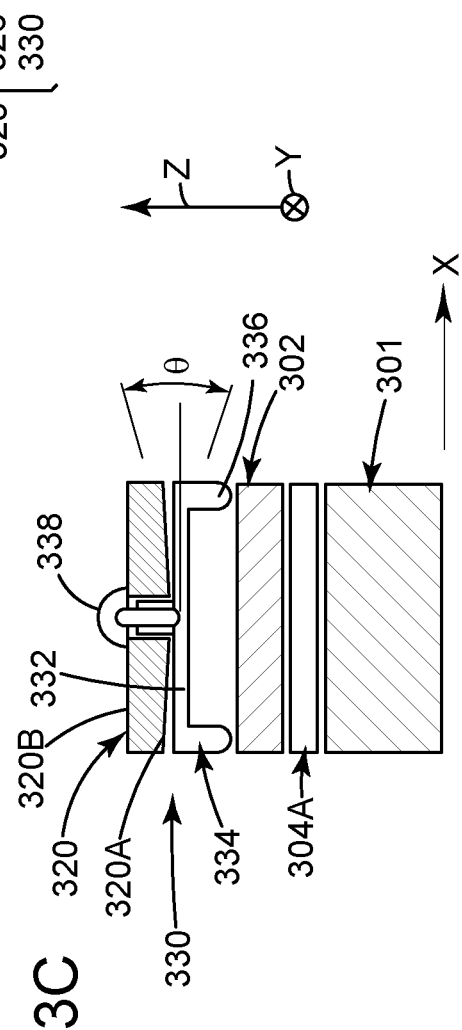

The novel clamp and collar system 302, 320 is illustrated in FIGS. 3A to 3C. FIG. 3A shows an LVC system 300 attached to a streamer 301. An ancillary device 310 is shown being attached to the LVC system 300 through a connecting mechanism 309. Connecting mechanism 309 may be a hook, a screw, keyhole-shaped dovetail slots, locking cams or any other interface for removably attaching the ancillary device to the external face of the collar.

A cross-section along line 3B-3B in FIG. 3A is illustrated in FIG. 3B. This cross-section shows, from inside out, the streamer 301, the elastic isolation pads 304A to 304D being attached to the clamp 302 and riding on the streamer 301, and the suspension system 330 being located between the clamp 302 and the collar 320. FIG. 3C shows a cross-section along line 3C-3C in FIG. 3B. FIG. 3C shows the elastic isolation pad 304A being sandwiched between the streamer 301 and the clamp 302, and the suspension system 330 being sandwiched between the clamp 302 and the collar 320.

A vibration mitigation system 325 of the LVC system 300 includes at least one of the following three parts, the elastic isolation pad 304, a gasket 326, and the suspension mechanism 330. Each of these parts are discussed next in more detail.

Figure 4A:
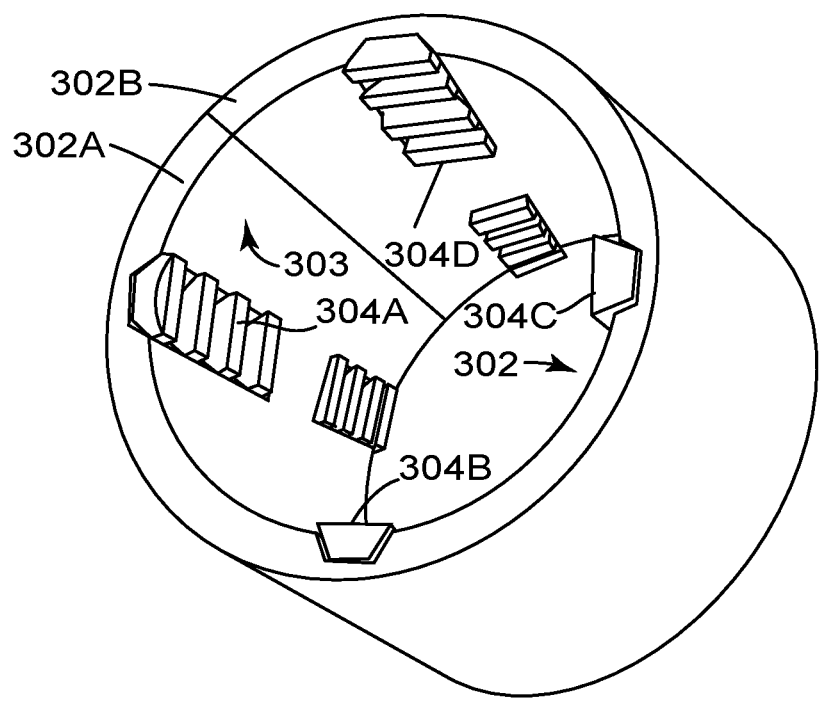
FIGS. 4A and 4B illustrate a clamp and associated pads of the low-vibration collar system.

As previously discussed, the ancillary device 310 may be any traditional device that is attached to a streamer, for example, a navigation control device, recovery device, etc. The clamp 302 may be a two-part device having a cylindric shape made out of two halves 302A and 302B (see FIG. 4A) made out of plastic or metal. Other materials may be used. An interior 303 of clamp 302 is shown in FIG. 4A as having elastic isolation pads 304A to 304D. This is the first vibration mitigation mechanism (1) discussed above. Although the figure shows four pairs of such pads, one skilled in the art would understand that in one application the LVC system has only three pairs of pads or more than four pairs of pads.

Figure 4B:
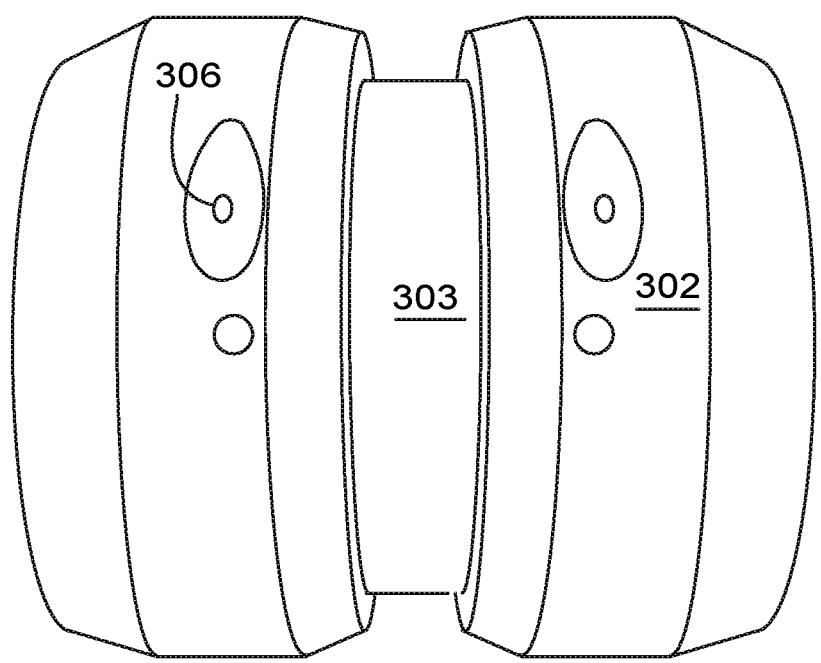

In still another application, the LVC system has the pads not in pairs. Further, FIG. 4B shows a connecting mechanism 306 (e.g., a screw) that holds the two parts 302A and 302B of the clamp 302 attached to the streamer. FIG. 4B also shows a groove 303 formed in the body of the clamp 302. As discussed later, this groove may receive a pin from the collar for preventing the collar to translate relative to the clamp along the streamer.

The elastic isolation pads may be made of low durometer (e.g., 10 to 30 Shore A plastic or polymer material) and these pads negate the hard mounting typical of streamer clamps. FIG. 3C shows one of the pads 304 being sandwiched between the interior surface of the clamp 302 and the streamer 301. In one embodiment, the elastic isolation pad 304 is a critically damped pad. A critically damped pad is defined as follows. When an oscillation is induced by the ancillary device 310, due to its interaction with the ambient water, the collar 320 moves together with the ancillary device. This motion is traditionally transmitted to the streamer through the clamp 302. However, according to this embodiment, the elastic isolation pad 304 attenuates this movement. If the elastic isolation pad extinguishes this movement after a single oscillation, then the pad is called critically damped. Such a property of the pad can be calculated for any given ancillary device.

The second vibration mitigation mechanism (2), i.e., the pre-loaded assembly, is illustrated in FIG. 3B. According to this mechanism, because the collar 320 is made of two parts 320A and 320B, which are held together by a hinge 322, when the two parts are closed, for example, with a latching device 324, there is a rattle between the two parts of the collar 320. This rattle movement is enough to introduce a noise in the frequency spectrum of interest of the recording seismic sensors. Thus, according to this embodiment, an elastic gasket 326, which pre-loads the latching collar assembly, is placed between the two parts 320A and 320B, to eliminate the rattle motion. The elastic gasket 326 may be glued to one part of the collar. When the collar is closed, due to the pressure exerted by the elastic gasket 326 between the two parts 320A and 320B, no rattling motion appears. The elastic gasket may be made of various materials, for example, rubber.

Figure 5A:
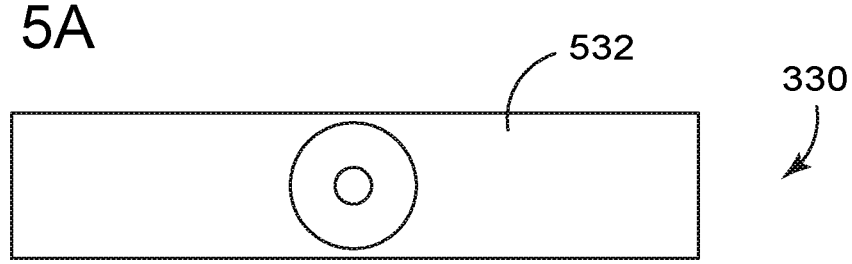
Figure 5B:
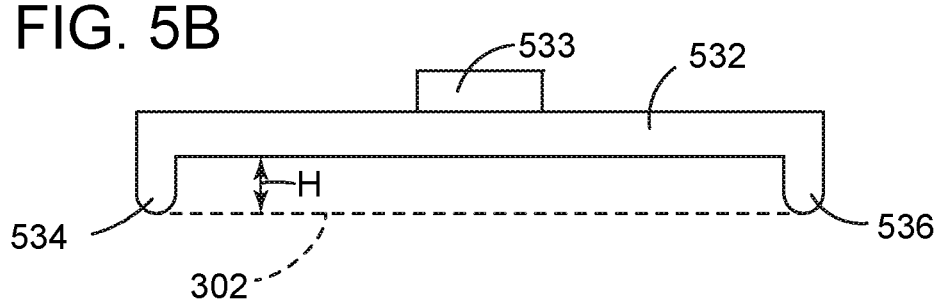
Figure 5C:
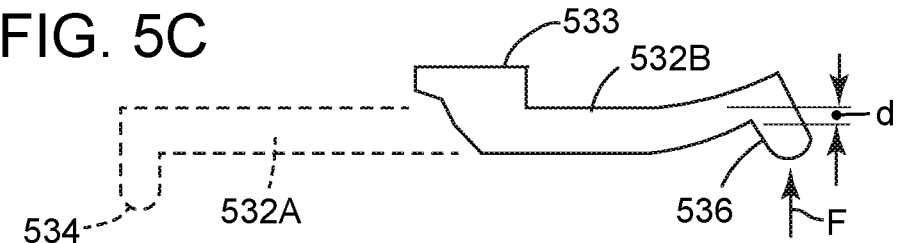

The third vibration mitigation mechanism (3), i.e., the suspension system 330, is illustrated in FIGS. 5A to 5F. FIG. 5A shows a top view of the suspension system 330 having a spring leaf body 532 that is ending with two skis 534 and 536 (see FIG. 5B). The body 532 is elastic and can bend as illustrated in FIG. 5C. FIG. 5B shows the body 532 having a base 533, which is fixedly attached to an inside of the collar 320. Thus, when the body 532 is experiencing a bending force F, the two sides 532A and 532B of the body 532 act independent of each other as illustrated in FIG. 5C, i.e., each side is displaced with a displacement d that is proportional with the force F that acts on the ski. The two forces that act on the two skis 534 and 536 may be the same or different.

Figure 5D:
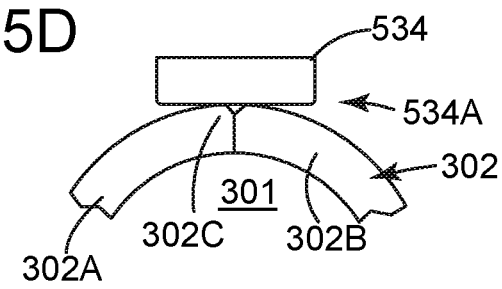
Figure 5E:
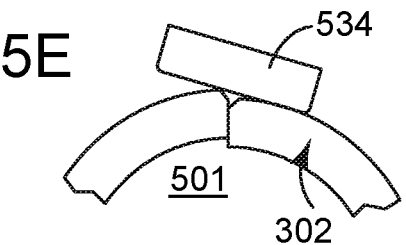

FIG. 5D shows a side view of the ski 534 and the ski 534 has a bottom side 534A that is flat. This flat bottom 534A rides directly on the clamp 302 and acts to spatially filter a chamfer 302C formed in the clamp 302, as illustrated in FIGS. 5D and 5E. Note that FIG. 5E shows the ski 534 rotating to easy/smooth a transition from one half 302A of the clamp 302 to the other half 302B, especially when the two halves are not well aligned. Further, the middle part of the body 532 can move up and down between the clamp and the collar while the streamer 501 is towed under water. As shown in FIG. 5C, the body 532 is located at a height H relative to the surface of the clamp 302. In other words, the body 532 is located higher than the bottom parts of the skis 534 and 536, which ride on the clamp 302. This feature ensures that only the skis contact the clamp.

Note that although the two parts 302A and 302B of the clamp 302 are manufactured with high precision, when assembled, the chamfer portion 302C is not uniform, i.e., there is a bump or difference in height of the two parts and this difference produces a jolt in the traditional collar when rotating along the external surface of the clamp. The suspension system 330 discussed above is designed to filter out that jolt.

FIG. 5F shows four suspension systems 330 attached to an inside of the collar 320. The suspension system 330 may be attached in various ways to the collar 320, for example, with a screw 538. FIG. 5F also shows the closing mechanism 524 of the collar 320, having a first part 524A and a second part 524B.

As shown in FIG. 5B, the suspension system 330 has only the skis in contact with clamp 302. As the body 332 is elastic and not in contact with the clamp 302, and because the body 332 is attached with a screw 538 to the collar 320, the collar 320 is capable to move relative to the clamp 302 with at least two degrees of freedom: (i) translate along a vertical axis Z and (ii) rotate by an angle θ relative to a horizontal axis X (that enters into the page) as illustrated in FIG. 3C. In this regard, note that the bottom face 320A of the collar 320 is curved while the top face 320B is flat. The curved bottom face 320A allows the collar 320 to rotate by angle relative to axis X. Angle θ may be between 3 and 30 degrees.

The suspension system discussed above eliminates the traditional loose fit of the collar and clamp, which is common in devices of this type as the ancillary devices are required to rotate freely about the streamer's longitudinal axis X. As the ancillary device moves through the water it has two degrees of freedom (transverse and pitching) that can produce an impulse input (vibration) to the clamp and thus to the streamer. The suspension system discussed above eliminates the impulsive input under normal operating conditions of the ancillary device. The suspension system may be fabricated from a low-friction material to minimize the torque required for rotation about the longitudinal axis X.

Figure 6A:
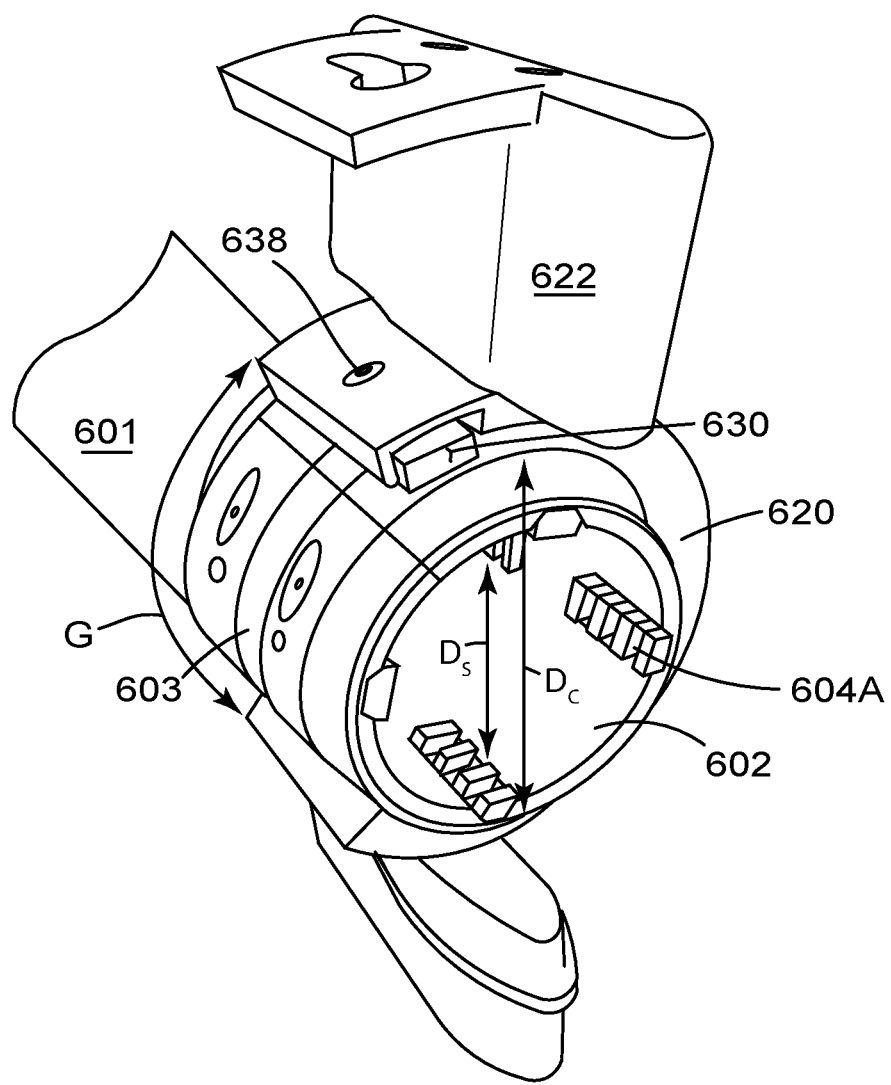
FIGS. 6A to 6D illustrate another low-vibration collar system.

An alternate embodiment of an LVC system is shown in FIGS. 6A to 6D. LVC system 600 is attached to a streamer 601 as in the previous embodiments, but its collar only partially encircles the streamer as shown in FIG. 6A. More specifically, LVC system 600 includes a clamp 602 to which one or more elastic isolation pads 604A are attached to. When the clamp 602 is attached to the streamer, the elastic isolation pads are sandwiched between the streamer and the clamp. A collar 620 is attached to the clamp 602 and uses one or more suspension systems 630, which are attached with corresponding screws 638 to the clamp 620. Note that FIG. 6A shows the clamp 602 to be a full circle while collar 620 has a gap G (i.e., only partially enclosed the clamp). The embodiment shown in FIGS. 6A and 6B has only three such suspension systems. However, more suspension systems may be used. The suspension system 630 may have the same configuration as the one discussed above with regard to FIG. 5A to 5F.

Figure 6C:
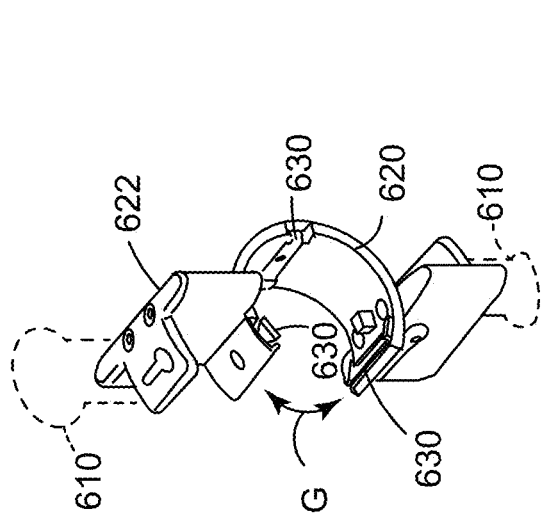
Figure 6B:
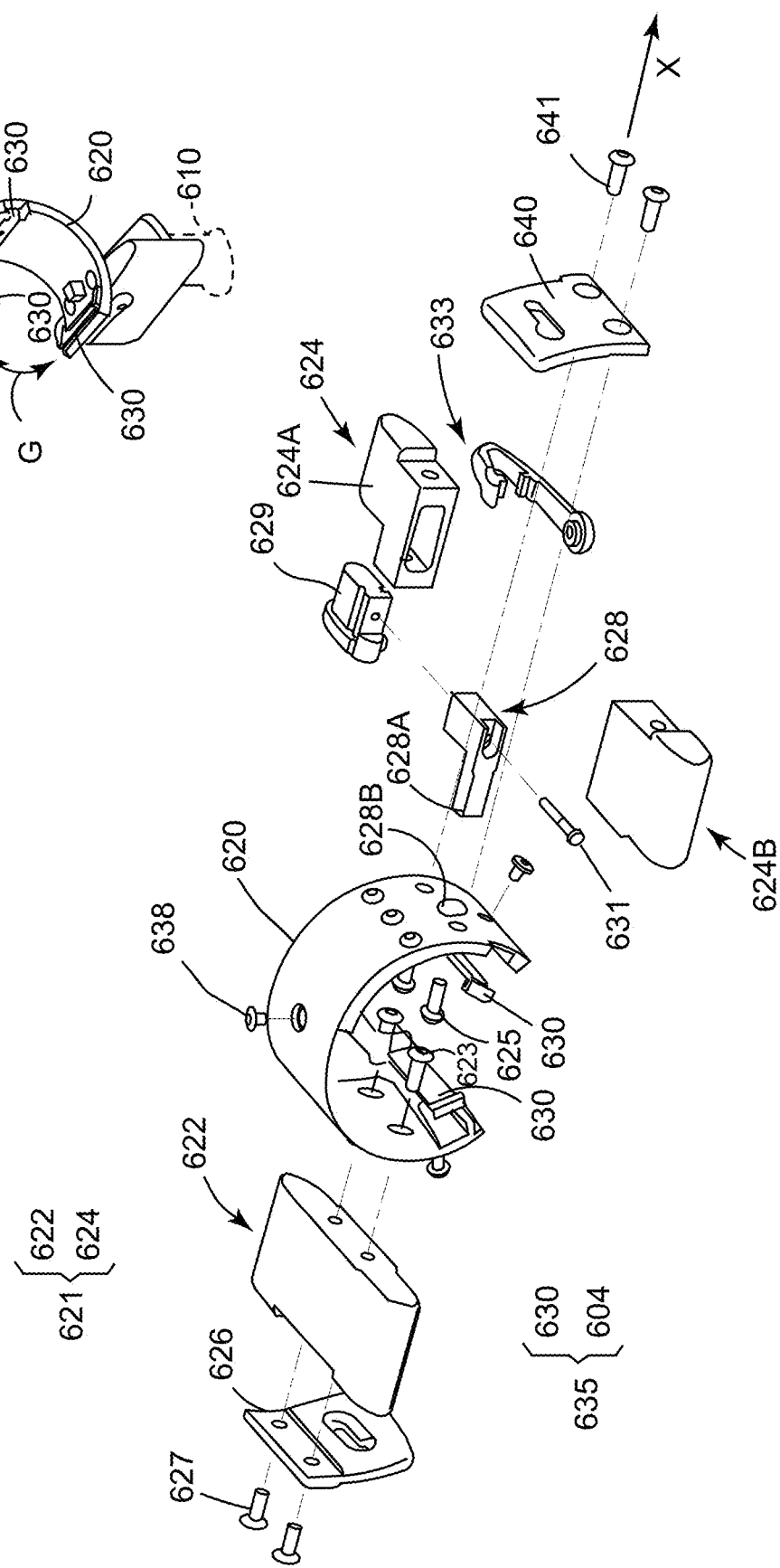

Different from the previous embodiments, the present collar 620 has an integrated strut system 621 that has a first strut 622 (upper strut) and a second latch strut 624 (lower strut). The first strut 622 (see FIGS. 6B and 6C) is attached to a top portion of the collar 620 with corresponding screws 623. A bracket 626 may be attached to the first strut with corresponding screws 627 as shown in FIG. 6C. This bracket may be used to attach the ancillary device 610 to the collar 620, as shown in FIG. 6B. The second latch strut 624 is attached to a bottom portion of the collar 620 with corresponding screws 625. The second latch strut 624 is formed from two parts 624A and 624B, which attach to each other.

A latch pin 628 and a latch button 629 are attached to each other with a screw 631 and these elements are housed by the second latch strut 624. A bracket 640 is attached to the second latch strut 624 with a screw 641. A tip 628A (see FIGS. 6B and 6C) of the latch pin 628 extends through a corresponding hole 628B formed in the collar 620 and presses against a groove 603 (see FIG. 6A and groove 303 in FIG. 4B) formed in the clamp 602. The latch pin and latch button form a mechanism for attaching the collar 630 to the clamp 602. Note that when parts 624A and 624B are assembled to form the second latch strut 624, the operator of the streamer can translate one of the parts relative to the other by simply pressing the two parts toward each other along the X axis in FIG. 6B. When this translation of one part relative to the other takes place, latch pin 628 retrieves inside the second latch strut 624 and the collar 620 can translate relative to the clamp 602 along the X axis. If the latch pin 628 extends into the groove 603, the reciprocal translation of the collar 620 and the clamp 602 is stopped. To prevent an accidental actuation of the latch button 629, a security tab 633 is located between the two parts 624A and 624B. The security tab 633 does not allow the activation of the latch pin 628.

Figure 6D:
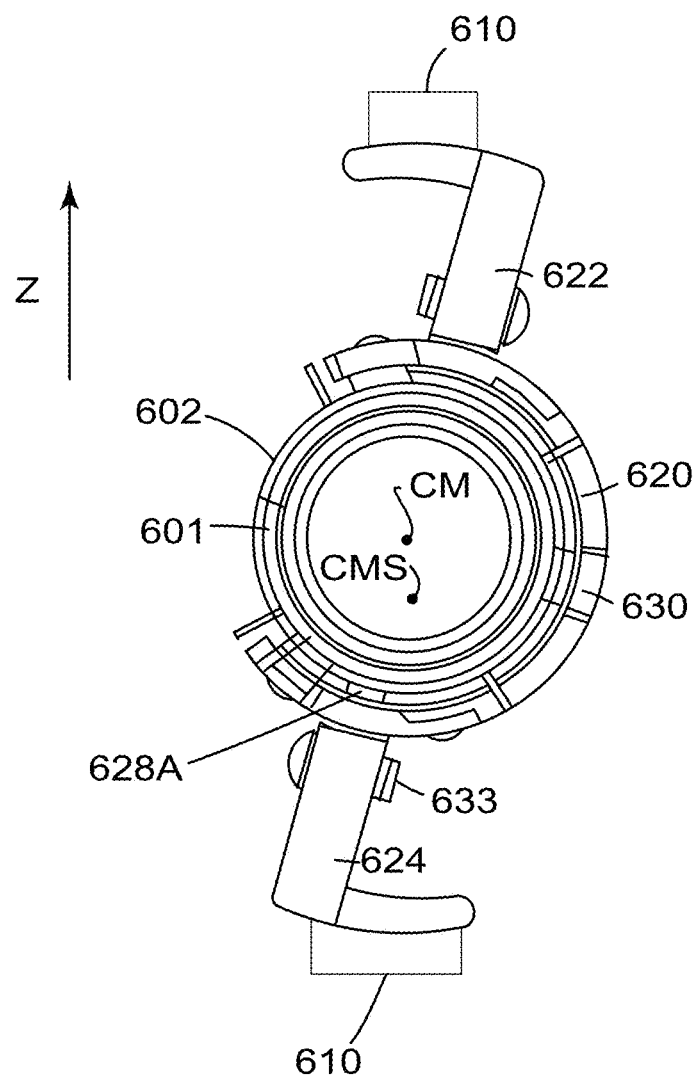

In one application, the integrated strut system 621 is manufactured so that a center of gravity CMS of the first strut 622 and the second latching strut 624 is below a center of gravity CM of the streamer 601, so that the integrated strut system and the collar 620 are aligned with a vertical axis Z to aid in the orientation of the attached devices 610, as illustrated in FIG. 6D.

The integrated strut system 621 provides improved flow, which reduces turbulence (i.e., less vibration forces acting on the streamer) when the streamer is towed in water, minimizes the biologic growth by improving the flow of water, provides hydrodynamic damping to rotational motion, and increases the radial distance from the streamer's center to the ancillary tool, which may increase the dynamic righting moment of the device.

In one application, the LVC system 600 has a self-contained locking pin, i.e., the locking pin 628 of the second latch strut 624. The existing systems require the user to attach a strap and/or insert a secondary screw in order to keep the collar attached to the clamp. The locking pin 628 provides this functionality. The present LVC system 600 is further different from the existing devices in the sense that it can be installed either from the head or tail of the streamer.

In one application, the gap G in the collar 620 is greater than a diameter Ds of the streamer, but less than a diameter Dc of the clamp 602 (see FIG. 6A). The vibration mitigation system 635 in this embodiment includes no gasket because the collar 620 does not have a hinge and latching mechanism. However, the vibration mitigation system 635 includes at least one of the suspension mechanism 630 and the elastic isolation pads 604.

According to an embodiment illustrated in FIG. 7, there is a method for attaching an ancillary device to a streamer with a low-vibration collar system 300 or 600. The method includes a step 700 of attaching a clamp 302/602 to the streamer 301 towed underwater, a step 702 of attaching a collar 320/620 to the clamp 302, a step 704 of attaching the ancillary device to the collar with a connecting mechanism 309 located on the collar, and a step 706 of attenuating an amplitude of a vibration produced by the ancillary device with a vibration mitigation system (325, 525, 635). The vibration mitigation system includes plural elastic insulation pads located between the streamer and the clamp and a suspension mechanism located between the clamp and the collar. The vibration interferes with seismic data recorded by seismic sensors located on the streamer and thus, by reducing these vibrations, the clamp and collar system of this application permits the acquisition of more accurate seismic data.

The disclosed embodiments provide an apparatus and method for cable vibration mitigation. It should be understood that this description is not intended to limit the invention. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A low-vibration collar system for vibration mitigation comprising:
 a clamp attached to a streamer towed underwater by a seismic vessel, the streamer comprising a plurality of sensors to record seismic data;
 a collar configured to be attached to the clamp;
 a connecting mechanism located on the collar and configured to attach an ancillary device to the collar; and
 a suspension mechanism located between the clamp and the collar and configured to attenuate an amplitude of a vibration produced by the ancillary device,
 wherein the vibration interferes with seismic data recorded by seismic sensors located on the streamer.

2. The system of claim 1, further comprising: a series of elastic isolation pads spaced around a circumference of the streamer, the series of elastic isolation pads being attached to the clamp.

3. The system of claim 2, wherein the series of elastic isolation pads are critically damped.

4. The system of claim 1, wherein the suspension mechanism includes a series of flexible beams spaced around a circumference of the streamer.

5. The system of claim 4, wherein the collar moves independent of the clamp due to the suspension mechanism.

6. The system of claim 4, wherein the suspension mechanism comprises:
 a spring leaf body; and
 first and second skis, each of the skis being attached to one end of the spring leaf body.

7. The system of claim 6, wherein the skis spatially filter surface imperfections in the clamp.

8. The system of claim 6, wherein the first and second skis are in direct contact with the clamp while the leaf spring body is not.

9. The system of claim 1, wherein the collar fully encircles the streamer.

10. The system of claim 1, wherein the collar only partially encircles the streamer.

11. The system of claim 10, further comprising:
a first strut connected to the collar; and
a second strut connected to the collar, opposite to the first strut,
wherein a center of gravity of the first strut and the second strut is below a center of gravity of the streamer.

12. The system of claim 1, wherein the vibration mitigation system further includes:
an elastic element located between two halves of the collar.

13. A low-vibration collar system for vibration mitigation comprising:
a clamp to be attached to a cable;
a collar located over the clamp and only partially encircling the cable, the collar being configured to receive an ancillary device; and
a vibration mitigation system configured to attenuate an amplitude of vibrations produced by the ancillary device, the vibration mitigation system including a suspension system attached to an inner part of the collar, the suspension system being sandwiched between the clamp and the collar.

14. The system of claim 13, further comprising:
a connecting mechanism attached to the collar and configured to receive the ancillary device.

15. The system of claim 14, wherein a center of gravity of the connecting mechanism is lower than a center of gravity of the streamer.

16. The system of claim 14, wherein the connecting mechanism comprises:
a latching pin that enters through the collar to contact a corresponding groove in the clamp.

17. The system of claim 13, further comprising:
one or more elastic isolation pads attached to the clamp and riding on the streamer.

18. A method for attaching an ancillary device to a streamer with a low-vibration collar system, the method comprising:
attaching a clamp to the streamer towed underwater;
attaching a collar to the clamp;
attaching the ancillary device to the collar with a connecting mechanism located on the collar; and
attenuating an amplitude of a vibration produced by the ancillary device with a vibration mitigation system, wherein the vibration mitigation system includes plural elastic insulation pads located between the streamer and the clamp and a suspension mechanism located between the clamp and the collar, and
wherein the vibration interferes with seismic data recorded by seismic sensors located on the streamer.

* * * * *